(12) United States Patent
Onuki et al.

(10) Patent No.: US 6,609,941 B1
(45) Date of Patent: Aug. 26, 2003

(54) VEHICLE LAMP ASSEMBLING APPARATUS

(75) Inventors: Fujio Onuki, Shizuoka (JP); Shinobu Matsui, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 478 days.

(21) Appl. No.: 09/698,220

(22) Filed: Oct. 30, 2000

(30) Foreign Application Priority Data

Oct. 28, 1999 (JP) .......................................... 11-306986

(51) Int. Cl.[7] .............................. H01J 9/46; G01J 1/10
(52) U.S. Cl. .......................... 445/66; 445/50; 445/62; 356/121; 356/123; 29/700; 29/705; 29/707
(58) Field of Search ............................. 445/63, 66, 69; 356/121, 123, 122; 29/700

(56) References Cited

U.S. PATENT DOCUMENTS

| | | | | |
|---|---|---|---|---|
| 2,767,675 A | * | 10/1956 | McGowan | 445/71 |
| 3,830,570 A | * | 8/1974 | Groetzner et al. | 356/121 |
| 5,751,832 A | * | 5/1998 | Panter et al. | 356/121 |
| 6,514,114 B1 | * | 2/2003 | Ishigaki et al. | 445/66 |

* cited by examiner

Primary Examiner—Kenneth J. Ramsey
Assistant Examiner—Mariceli Santiago
(74) Attorney, Agent, or Firm—Sughrue Mion, PLLC

(57) ABSTRACT

An vehicle lamp assembling apparatus including a jig which supports a lamp component, an apparatus main body having disposed thereon positioning and fastening mechanisms (plungers and engagement holes) for positioning and fastening the jig to the apparatus main body. Some equipment (contact units) is disposed on the apparatus main body, and/or on the jig, for carrying out a predetermined processing, such as working or inspection, on the lamp component supported by the jig. Further, a control part is disposed on the apparatus main body, for drive control of the equipment. An ID plate that stores processing information, such as driving procedures and driving amount of the equipment, is disposed on the jig, whereas a non-contact memory reader is disposed on the apparatus main body so as to oppose the ID plate when the jig is fastened to the apparatus main body. The control part drives the equipment based on the processing information read from the ID plate via the memory reader. Thus, the amount of equipment-drive-control data stored in the control part of the apparatus main body is reduced, and the control part need not be a high-performance CPU.

18 Claims, 8 Drawing Sheets

VEHICLE LAMP ASSEMBLING APPARATUS

BACKGROUND OF THE INVENTION

1. Field of the Invention

This invention relates to a lamp assembling apparatus that is installed in a vehicle lamp assembly line and, more specifically, relates to a lamp assembling apparatus in which a prescribed processing, such as working or inspection, is carried out. The prescribed processing is carried out on a work—such as a lamp or a lamp component—that is supported on the jig, through positioning and fastening the work with the jig, and through driving of the apparatus main body and/or of some equipment disposed on the jig.

2. Description of the Related Art

A plurality of assembling apparatuses, where prescribed processing is carried out on the work, are installed in a head lamp assembly line. Each apparatus main body is provided with some equipment for carrying out the prescribed processing, and with a control part for controlling the equipment, wherein each control part is provided with preset control data for driving the equipment.

A first apparatus disposes an aiming mechanism component inside the lamp body (also called a workpiece). Next, the workpiece is transferred to a second apparatus in which a reflector is attached to the aiming mechanism. The workpiece is then transferred to a third apparatus in which a seal groove is filled with sealing material, a seal leg is engaged with the seal groove, and a front lens is pressed into contact with the lamp body. Next, the workpiece is transferred to a fourth apparatus, wherein the front lens is clamped to the seal leg mechanically with a clip or a clamp screw. Finally, the work piece is transferred to a fifth apparatus, in which luminous intensity distribution is inspected by illuminating the lamp.

In each assembling apparatus that constitutes the conventional headlamp assembly line, the equipment drive conditions that specifically correspond to the type of workpiece (control data for drive control of the equipment) are preset in the control part. Therefore, the control data amount to be input to the control part increases with an increase in processing functions at the assembling apparatus, such as working and inspection, thereby increasing the load on the control part. Therefore, high performance has been required for the control part, which high-performance requirement leads to undesirably increased lamp production costs.

SUMMARY OF THE INVENTION

In order to solve the problems in the above-described related art, the present invention provides a vehicle lamp assembling apparatus that reduces the load on the equipment control part of the apparatus main body by relocating some of the equipment controlling data—for working or inspection of the workpiece—to a non-contact-type memory card disposed on the jig.

To achieve the above-described purpose, the vehicle lamp assembling apparatus according to one embodiment of the present invention includes:

a jig adapted to support a lamp component;

an apparatus main body having disposed thereon a positioning and fastening mechanism to fasten the jig to the apparatus main body;

equipment, disposed on at least one of the apparatus main body and the jig, for carrying out a processing operation on the lamp component supported by the jig;

a control part, disposed on the apparatus main body, to control the manner in which the equipment is driven;

a non-contact memory plate disposed on the jig, the non-contact memory plate storing processing information for equipment; and a non-contact memory reader disposed on the apparatus main body in a position opposite that of the non-contact memory plate when the jig is fastened to the apparatus main body, wherein the control part drives the equipment based on the processing information read from the memory plate via the non-contact memory reader.

When the jig is positioned and fastened to the apparatus main body, the memory reader on the apparatus main body is positioned opposite the memory plate on the jig. Thus, the processing information that is stored in the memory plate can be read by the non-contact-type memory reader. The control part on the apparatus main body controls the equipment that is disposed on the apparatus main body, and/or on the jig, based on information read by the memory reader.

Since some of the control data for driving the equipment—which data are necessary for assembling, working, or inspecting the workpiece—are stored in the non-contact-type memory plate on the jig, the amount of the control data to be stored in the control part on the apparatus main body is reduced by as much.

According to another aspect of the present invention, the jig in the vehicle lamp assembling apparatus includes a first jig for supporting a first lamp or lamp-component, and a second jig for supporting a second lamp or lamp-component, wherein the specifications of each lamp are different from those of the other lamp. Further, on each of the first and second jigs is disposed a non-contact-type memory plate which stores processing information, such as driving procedures for the equipment or driving amounts.

The equipment disposed on the apparatus main body and/or on the jig is controlled, by the processing information stored in the memory plate disposed on each jig. That is, processing of the first lamp, such as assembling, working or inspection, is carried out by using the first processing information on the first jig's memory plate, and processing of the second lamp, such as assembling, working or inspection, is carried out by using the second processing information on the second jig's memory plate.

BRIEF DESCRIPTION OF THE DRAWINGS

The above and other objects and advantages of the present invention will become more apparent by describing in detail preferred embodiments thereof with reference to the accompanying drawings, wherein like reference numerals designate like or corresponding parts throughout the several views, and wherein.

DETAILED DESCRIPTION OF THE PREFERRED EMBODIMENTS

Figure 1:
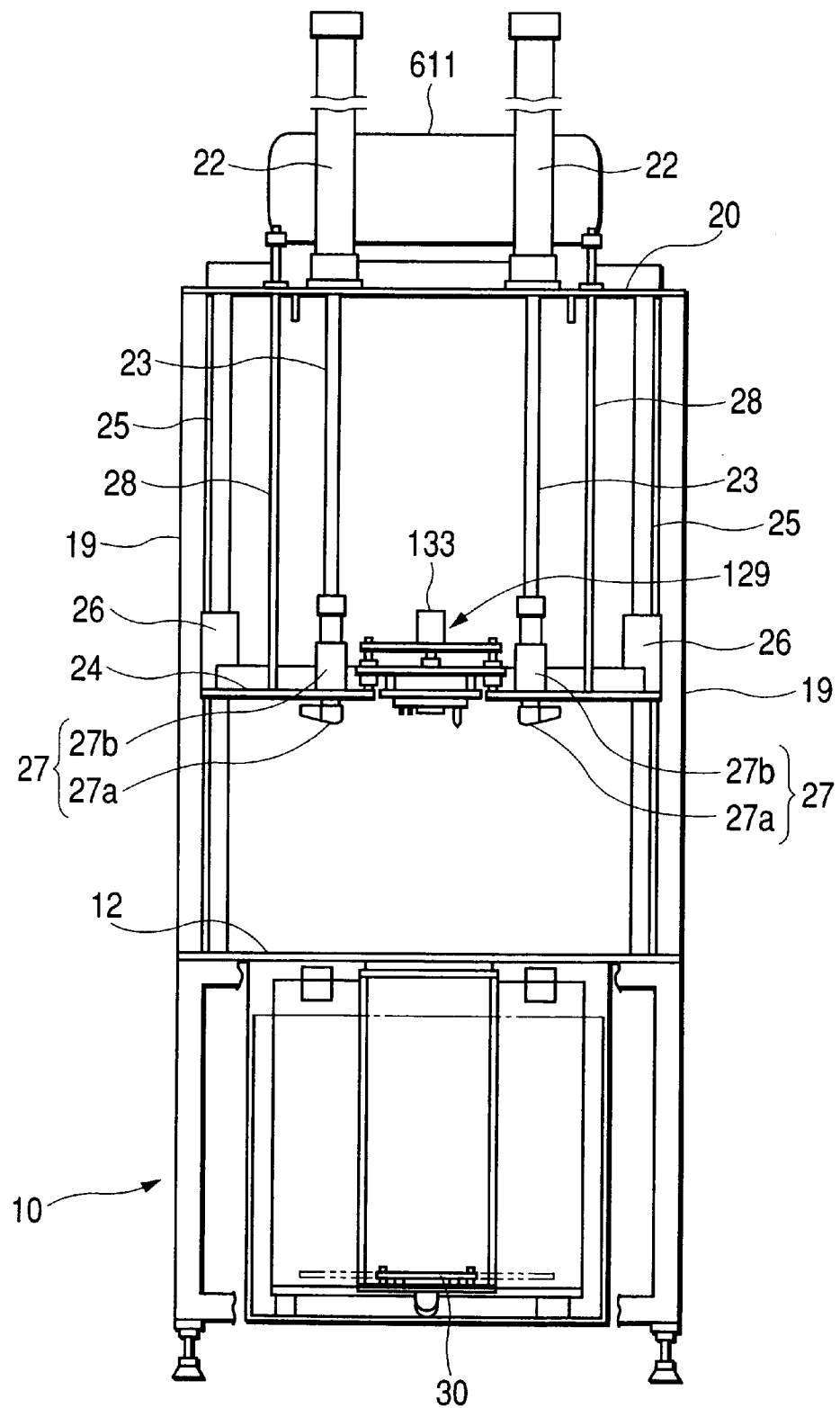
FIG. 1 is a front view of an apparatus according to the present invention as embodied in the final process of a headlamp assembly line for inspection of the headlamp's luminous intensity distribution.

FIGS. 1 through FIG. 8 show a first embodiment of the present invention. In these drawings, the apparatus for inspecting the luminous intensity distribution of the headlamp is viewed from the front and the lateral side. The apparatus has an overall rectangular frame structure, and includes a base plate 12, a jig-supportive base 10, and a tip plate 20. A lower jig 120 can be mounted to the base plate 12 which, in turn, is disposed on the rectangular jig-supportive base 10. Further, the jig supportive base 10 is provided with a screen 30 on the inside thereof. The top plate 20 is supported by a pair of upright side frames 19 on the right and left, and is disposed above the jig supportive base 10. An upper jig supportive plate 24 is so disposed on the top plate 20 so as to be movable vertically with air cylinders 22 that are lift mechanisms.

During operation of the apparatus, a headlamp W is set on the jig supportive base 10 so as to be supported by the lower jig 120. Then, when a headlamp bulb 400 is supplied with electric power via a contact unit 410 that is disposed on the upper jig 110, the bulb 400 (See FIGS. 3 and 8) is illuminated to project a luminous intensity distribution of the headlamp W onto the screen 30. An operator can then visually inspect the luminous intensity distribution of the headlamp.

Hereafter, the apparatus is explained in detail.

Each air cylinder 22 has a cylinder rod 23, wherein a bottom end of the cylinder rod 23 is connected to the upper jig supportive plate 24. Guide shafts 25 are disposed between the top plate 20 and the jig supportive base 10. Guides 26 are disposed on the upper jig supportive plate 24 to allow sliding movement of the upper jig supportive plate 24 along the guide shafts 25. Second guide shafts 28 are disposed between the top plate 20 and the upper jig supportive plate 24.

Four clampers 27—each of which is a joining mechanism for joining and retaining the upper jig 110 in a suspended state—are provided on the bottom surface of the upper jig supportive plate 24. Each of the dampers 27 includes an air cylinder 27b which can swing a clamp jaw 27a. Positioning plungers 116 are disposed on the upper jig 110. The positioning plungers 116 apply a spring force to maintain the plunger pins 116a in a state of upward protrusion from an upper plate 112.

When the upper jig supportive plate 24 is lowered toward a jig 100, that is mounted and positioned on the base plate 12, the plunger pins 116a fit into fitting holes 13 on the upper jig supportive plate 24 and, thus, the upper jig 110 is positioned against the upper jig supportive plate 24. Next, the clampers 27 are operated while the upper jig 110 is in contact with the upper jig supportive plate 24 so that front and rear side rims of the upper jig 110 are supported vertically by the upper jig supportive plate 24 and by the clamp jaws 27a. Thus, the upper jig 110 is joined and incorporated with the upper jig supportive plate 24. As described later, plungers 126 are provided on the lower jig 120. Because the lower jig 120 is positioned against the jig supportive base 10, and is connected to the upper jig 110, the plungers 116 for positioning of the upper jig 110 with respect to the upper jig supportive plate 24 are not necessarily required.

Figure 6:
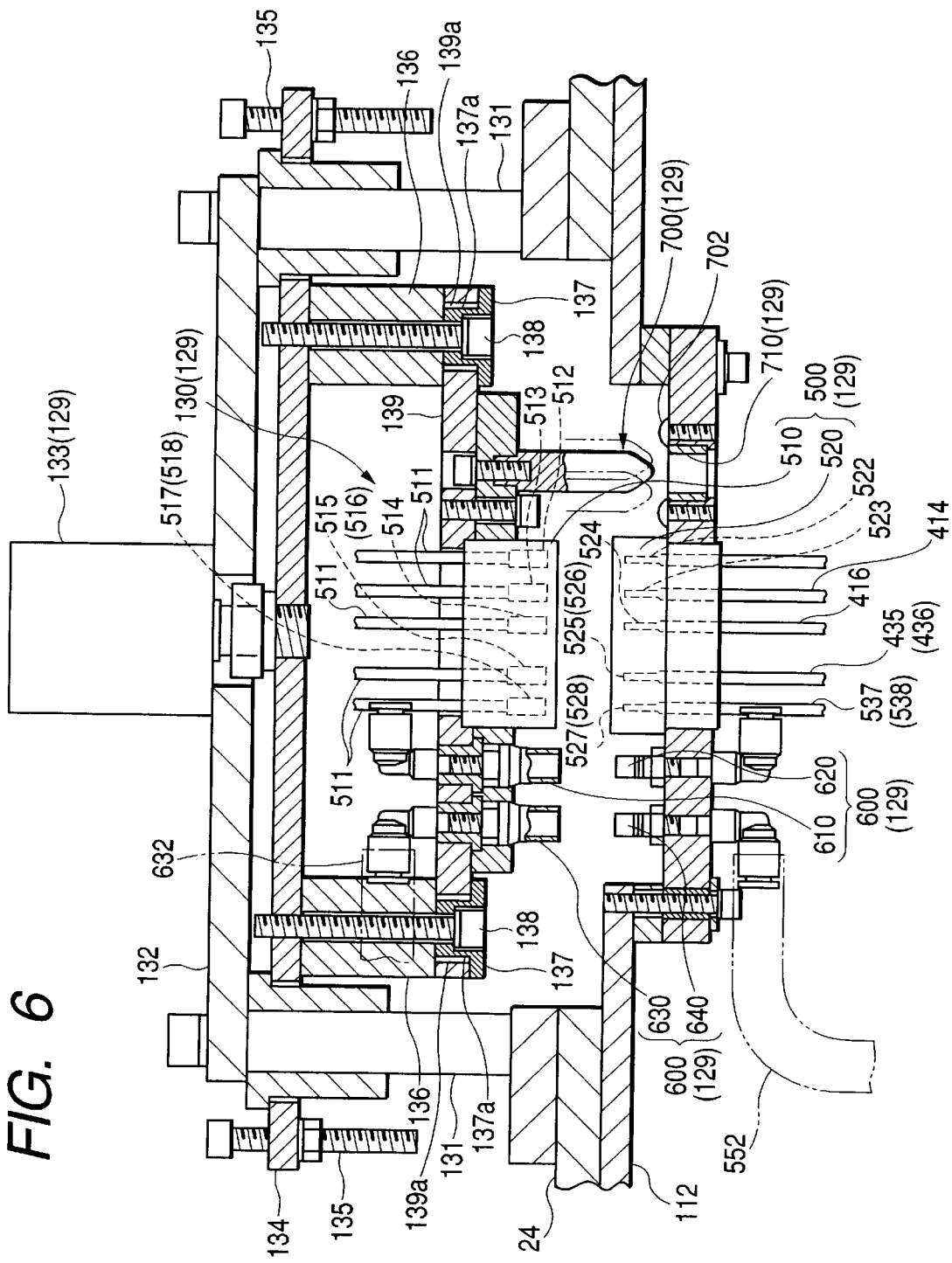
FIG. 6 is a sectional view of the connector and its surroundings before engagement of the connector part on the upper jig and the connector part on the apparatus main body.

As shown in FIG. 6, the upper jig supportive plate 24 is provided with a female connector 510 for the electric current supply source, and with female couplers 610 and 630 for the compressed air supply source. The upper jig 110 is provided with a contact unit 410, a contact unit 430, a male connector 520, a male coupler 640, and a male coupler 620. The contact unit 410 allows for illumination of an electric headlamp disposed on the upper jig 110 (See FIGS. 3 and 4). The contact unit 430 allows for illumination of a clearance lamp (See FIG. 4). The male connector 520 is electrically connected to a proximity switch 530 (See FIG. 3). The male coupler 640 is connected to an air cylinder 550, that is a fluid equipment, for causing vertical travel of the contact unit 430 for illuminating the clearance lamp. And the male coupler 620 is used for such other purposes as needed. Female terminals 512, 513, 514, 515 (516) and 517 (518), to which respective power supply cords 511 are connected, are housed on the inside of the female connector, whereas the female coupler 630 is connected to an air hose 632 that is connected to an air tank 611.

As described in detail later, a connector positioning-connecting-disconnecting mechanism 129—that is disposed on the upper jig supportive plate 24—allows connection and disconnection of the female connector 510 and the female couplers 610 and 630 to the male connector 520 and the male couplers 620 and 640, respectively, when the upper jig 110 is joined with the upper jig supportive plate 24.

Non-directional balls 125 are disposed in four corners at the bottom of the lower jig 120 so as to rotate freely, thereby facilitating travel of the lower jig 120 over the base plate 12. Potholes 14 (See FIG. 3), that engage with respective balls 125 of the lower jig 120, are formed on the top surface of the base plate 12. Further, a lower plate 122 of the lower jig 120 is provided with positioning plungers 126 that, by application of a spring force, can retain plunger pins 126a in a state of downward protrusion from the lower plate 122. The balls 125 of the lower jig 120 engage with the potholes 14 on the base plate 12, the plunger pins 126a engage with pin engagement holes 15 on the lower jig 120, and the bottom surface of the lower jig 120 comes into contact with the base plate 12, to position the lower jig 120 at a predetermined position on the base plate 12. Although the balls 125 and potholes 14 constitute positioning means for an approximate horizontal positioning of the lower jig 120 against the base plate 12, an accurate positioning is achieved by engagement of the plunger pins 126a and the pin engagement holes 15.

Figure 3:
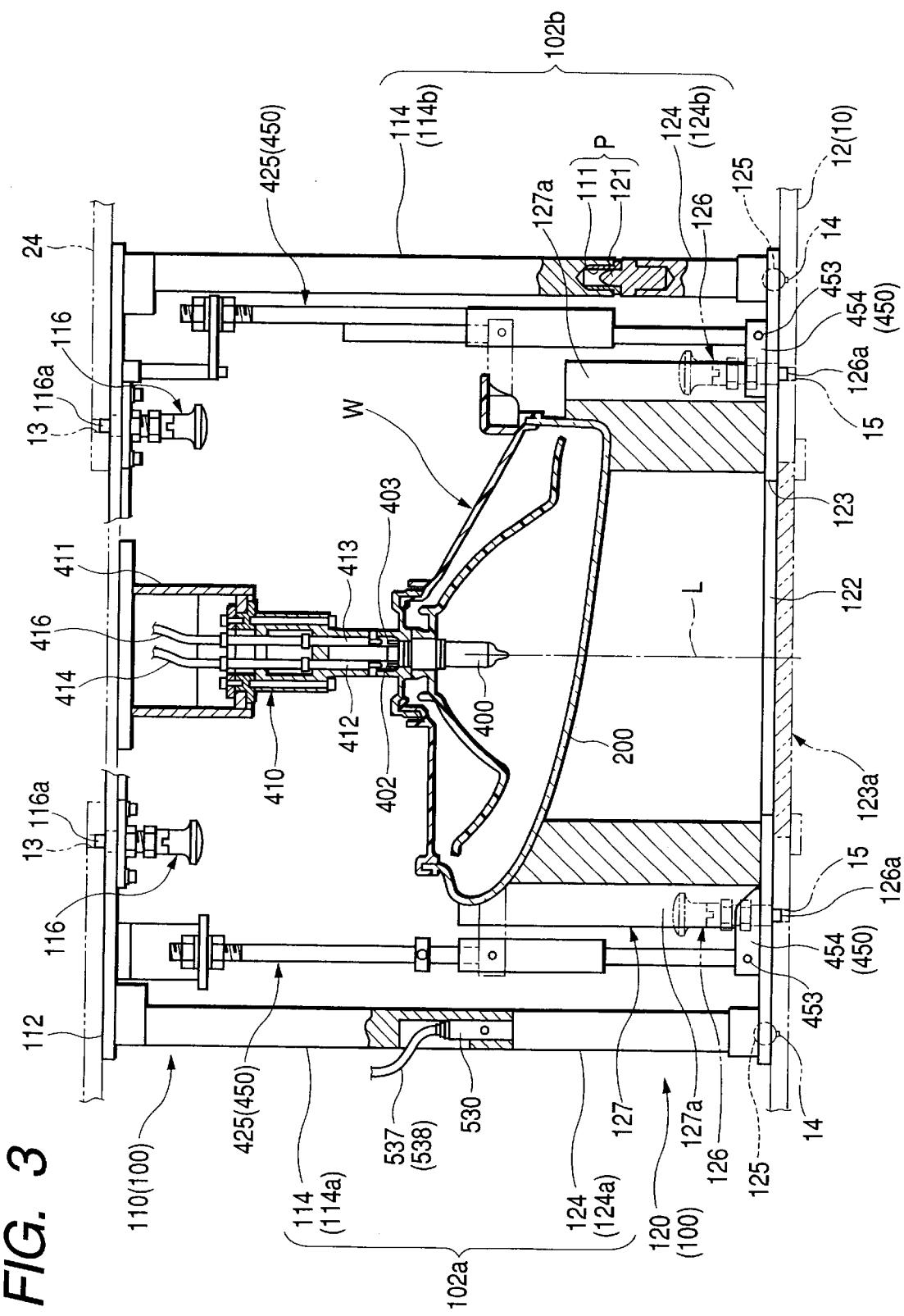
FIG. 3 is a front view of the jig used in the apparatus shown in FIG. 1.
Figure 4:
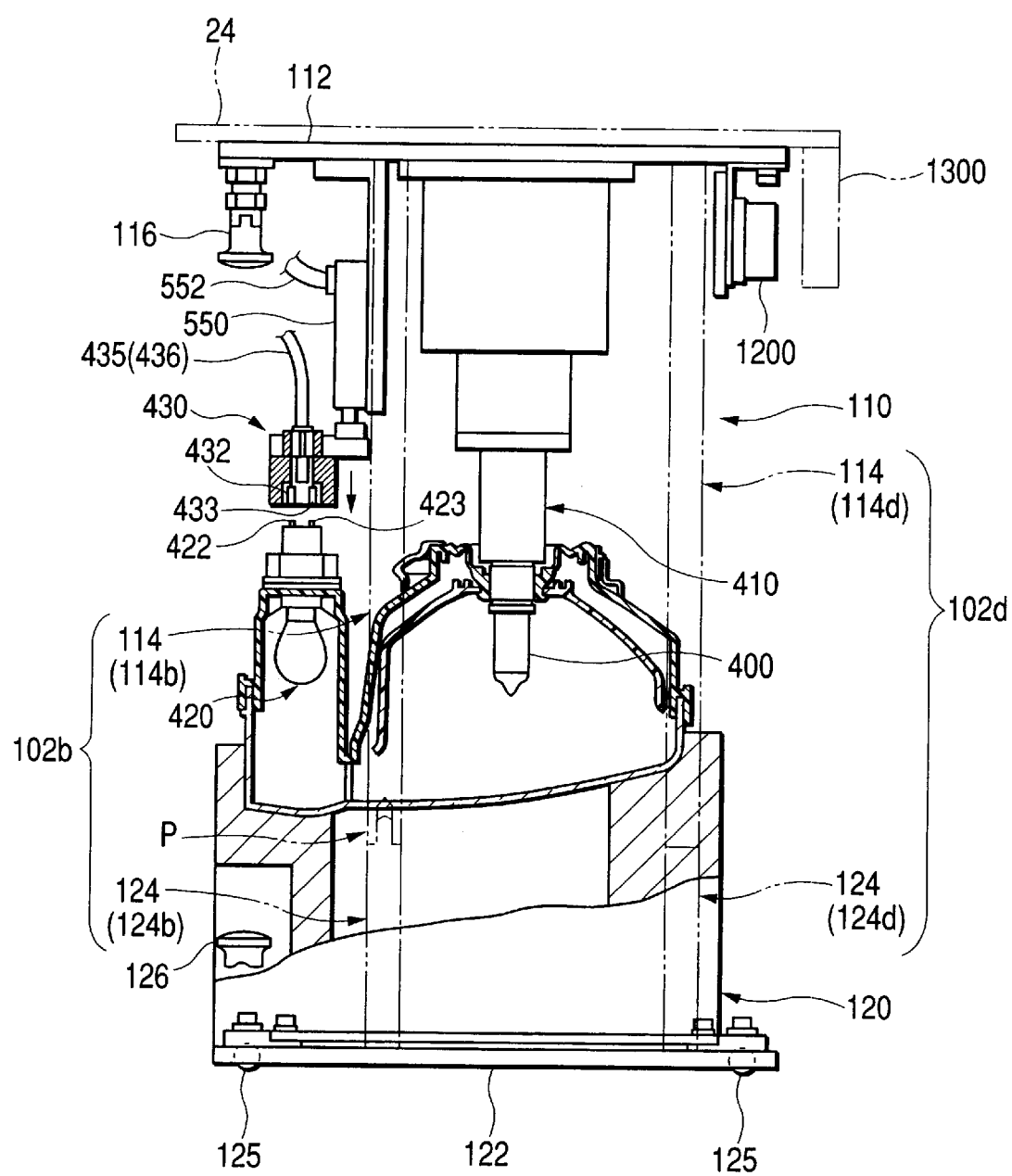
FIG. 4 is a side view of the jig as shown in FIG. 3.

As shown in FIGS. 3 and 4, the jig 100 includes four poles 102 (102a, 102b, 102c, 102d) which connect the upper plate 112 and the lower plate 122, wherein the upper plate 112 and the lower plate 122 are of the same rectangular shape and dimensions. Further, the four poles 102 (102a, 102b, 102c and 102d), are vertically dividable into two.

That is, the jig 100 is composed of the upper jig 110 having four pole components 114 (114a, 114b, 114c and 114d) which extend downward from the upper plate 112, and the lower jig 120 having four pole components 124 (124a, 124b, 124c and 124d) which extend upward from the lower plate 122. The upper four pole components 114 as well as the lower four pole components 124 are so positioned as to align with each other. This structure enables positioning of the upper jig 110 with respect to the lower jig 120, and enables incorporation of the jigs 110, 120 into the jig 100 through an axial concave-convex engagement between pairs of pole components 114b and 124b (114c and 124c) on each of the poles 102b (102c), wherein the poles 102b, 102c are positioned diagonally. FIGS. 3 and 4 show a concave-convex engagement part P that includes a concave part 111 on the pole component 114 and a convex part 121 on the pole component 124.

A proximity switch 530 (See FIG. 3) is disposed inside a bottom part of the pole component 114a of the upper jig 110. The proximity switch 530 detects a descent of the pole component 114a to a predetermined position that is proximate the corresponding pole component 124a when the upper jig supportive plate 24 is lowered. An electric power supply cord 537 (538) for electric power supply to the proximity switch 530 is connected to a male terminal 527 (528) that is housed inside the male connector 520 (See FIG. 6) that is disposed securely on the upper plate 112.

A contact unit 410, for supplying electric power to the bulb 400 of the headlamp W, is disposed on the upper jig 110. The electric contact unit 410 includes contacts 412 and 413 that correspond to terminals 402 and 403 on the bulb 400. The contacts 412, 413 are provided inside the supportive sleeve 411 that is suspended from the upper plate 112 and, when the upper jig 110 descends, the contacts 412 and 413 remain connected to the terminals 402 and 403 of the bulb 400. Electric power supply cords 414 and 416 are connected to the contacts 412 and 413, and are lead out of the contact unit 410. Further, power supply cords 414, 416 are connected to male terminals 523 and 524 that are housed inside the male connector 520 that is securely disposed on the upper plate 112 (See FIG. 6).

As shown in FIG. 4, the headlamp W is a combination headlamp having a clearance lamp incorporated therein. Electric power is supplied to a bulb 420 of the clearance lamp via another electric contact unit 430. An electric power supply cord 435 (436), extending through the contact unit 430 for connection to a contact 422 (423), is connected to a male terminal 525 (526) that is housed inside the male connector 520 (See FIG. 6). The air cylinder 550 moves the contact unit 430 vertically. An air hose 552, that leads from the air cylinder 550, is connected to the male coupler 640 that is securely disposed on the upper plate 112.

As shown in FIG. 3, forks 450 raise the headlamp—that was supported by the lower jig 120—when the upper plate 112 is raised. The forks 450 are suspended below the four corners of the upper jig 110. Each of the forks 450 is composed of a vertical rod 452 that is fastened to the upper plate 112, and that extends downward. An arm 454 is disposed at a lower end part of the vertical rod 452, and swings upward freely. That is, the arm 454 may swing upward around the pivot part 453 from a horizontal position when an upward pressure is applied thereto. Further, the arm 454 returns to its original horizontal position, by its own empty weight, when the upward pressure is removed. A vertical groove 127a is formed on the supportive frame 127 so that the forks 450 may travel vertically along the vertical groove 127a without interference from the supportive frame 127.

A control unit 1100 includes a CPU 1112 and a memory part 1114. The control unit 1100 is disposed at the upper end on the rear surface of the apparatus main body (See FIGS. 2 and 5). The CPU 1112 controls drive of an air cylinder, electric power supply to a bulb, and the like based on data stored in the memory plate 1114. For example, the CPU 1112 controls the drive of the air cylinder 550 on the upper jig 110 (See FIG. 4), and controls the drive of the air cylinder 27b for clamping operations (See FIGS. 1 and 2). Further, the CPU 1112 controls the air cylinder 22 for vertical travel of the upper jig supportive plate on the apparatus main body, controls the air cylinder 133 for connection and disconnection of the connector part, and further controls electric power supply to the bulbs 400 and 420 via the contact units 410 and 430.

Figure 2:
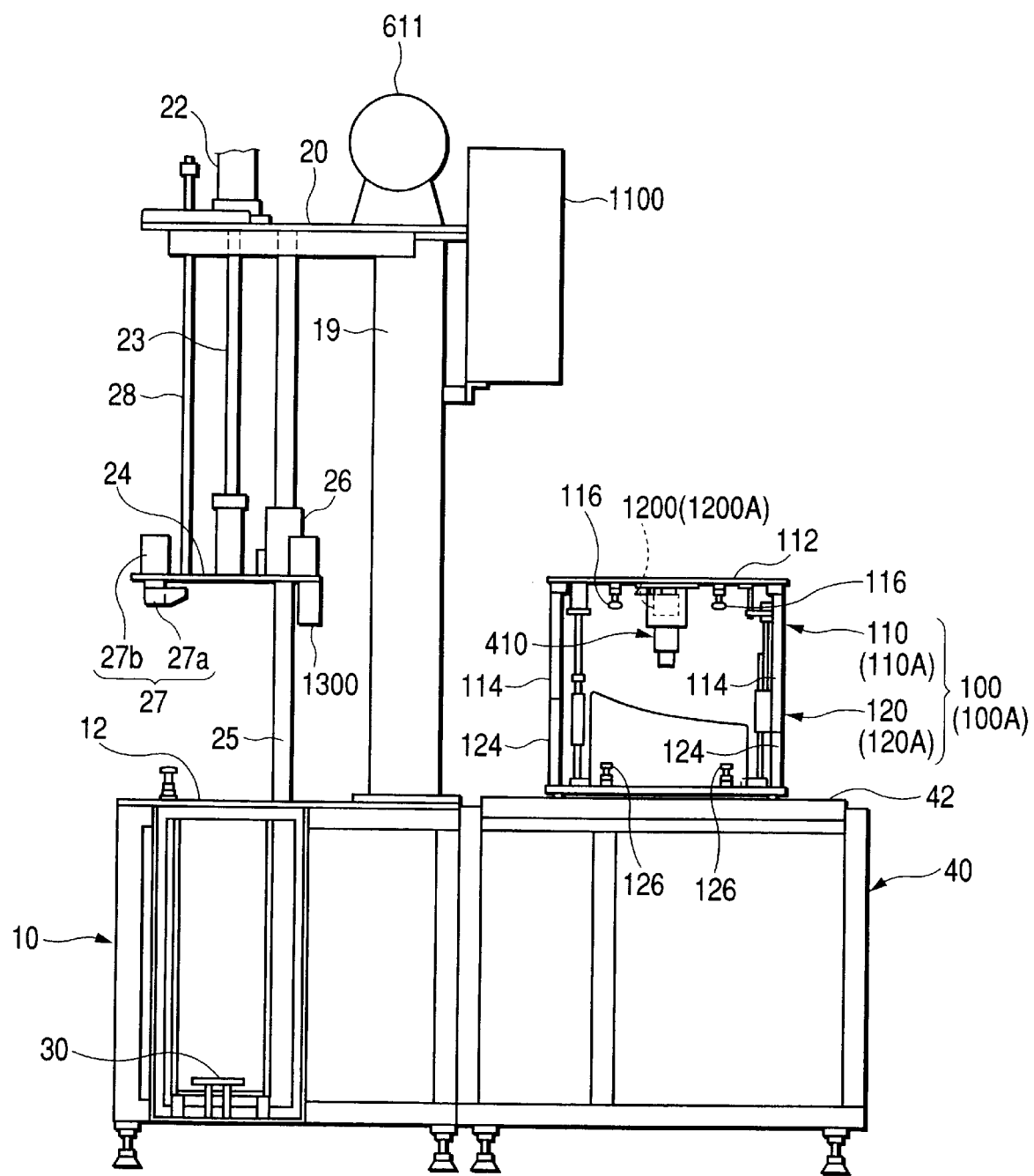
FIG. 2 is a right side view of the apparatus as shown in FIG. 1.
Figure 5:
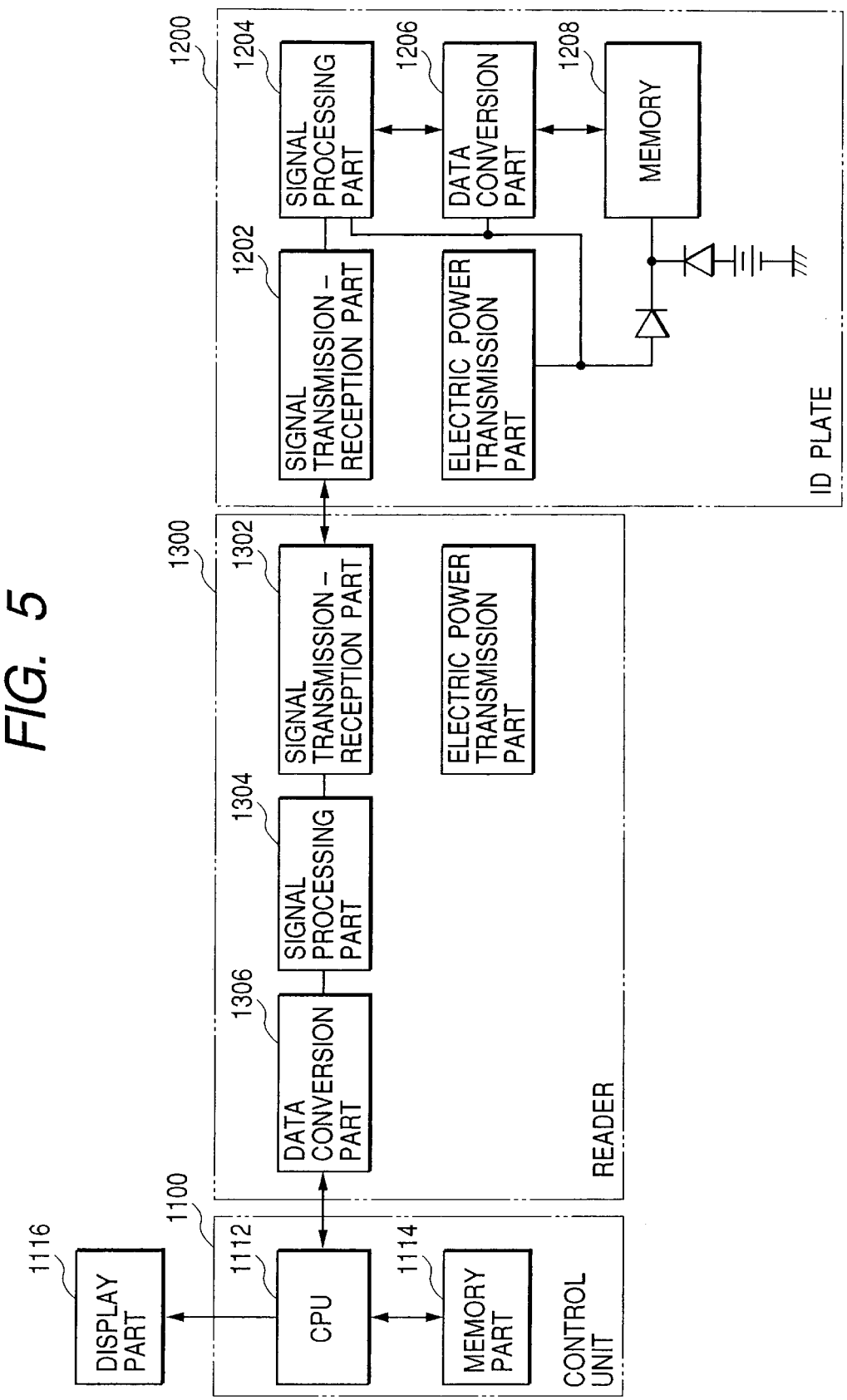
FIG. 5 is a diagram showing the configuration of the non-contact-type memory plate.

As in FIGS. 2, 4 and 5, an ID plate 1200 stores various data necessary for a luminous intensity distribution test on the headlamp. The ID plate 1200 is disposed on the upper rear surface of the upper jig 110. A non-contact-type reader 1300, for reading the data stored in the ID plate 1200, is disposed in a position that confronts the ID plate 1200 when the upper jig 110 is connected to the upper jig supportive plate 24. The CPU 1112 reads the data stored in the ID plate 1200 via the reader 1300 and, based on the readout data, carries out the luminous intensity distribution test on the headlamp.

That is, as shown in FIG. 5, the ID plate 1200 is a non-contact-type memory plate that is composed of a signal transmission-reception part 1202, a signal processing part 1204, a data conversion part 1206 and a memory 1208. Electromagnetic data exchange occurs between the signal transmission-reception part 1302 on the reader 1300 and the signal transmission-reception part 1202 which confront each other.

The memory 1208, of the ID plate 1200, stores data for operating conditions of various equipment that is used in the luminous intensity distribution inspection on the headlamp W (which is also called a workpiece) that is supported on the lower jig 120. The data includes illuminating voltage data, light-receiving position data for the photo sensors that are disposed on the screen 30, luminous intensity distribution classification data, bulb classification data, contact-part lift cylinder operating data, and the like. The data that are stored in the memory 1208 are converted from digital signals into serial signals by the data conversion part 1206, and are received by the signal transmission-reception part 1302 via the signal processing part 1204 and signal transmission-reception part 1202.

The data (serial signals) received by the signal transmission-reception part 1302 are converted into the digital signals by the signal processing part 1304 and the data conversion part 1306. The digital signals are then stored in the memory part 1114 via the CPU 1112 inside the control unit 1100. Next, the CPU 1112 carries out the inspection on the luminous intensity distribution of the headlamp through operation of the equipment, based on the data—including operational conditions of the equipment—that are stored in the memory part 1114.

A cylinder-shaped body-supportive frame 127 is disposed on the lower plate 122 of the lower jig 120. The frame 127 supports the outer rim of the front lens 200 of the headlamp What is mounted with its rear side up. An opening 123 is formed in the lower plate 122. A transparent window 123a, having reinforced transparent glass, is disposed in the opening 123. The screen 30, for projection of the luminous intensity distribution of the headlamp, is disposed horizontally under the window 123a. The screen 30 is structured so that it can slide to the right and left, as shown in FIG. 1, thus allowing it to be adjustably positioned along an optic axis L of the headlamp W. Because the screen 30 is adjustable, the apparatus can accommodate various types of lamps.

Figure 7:
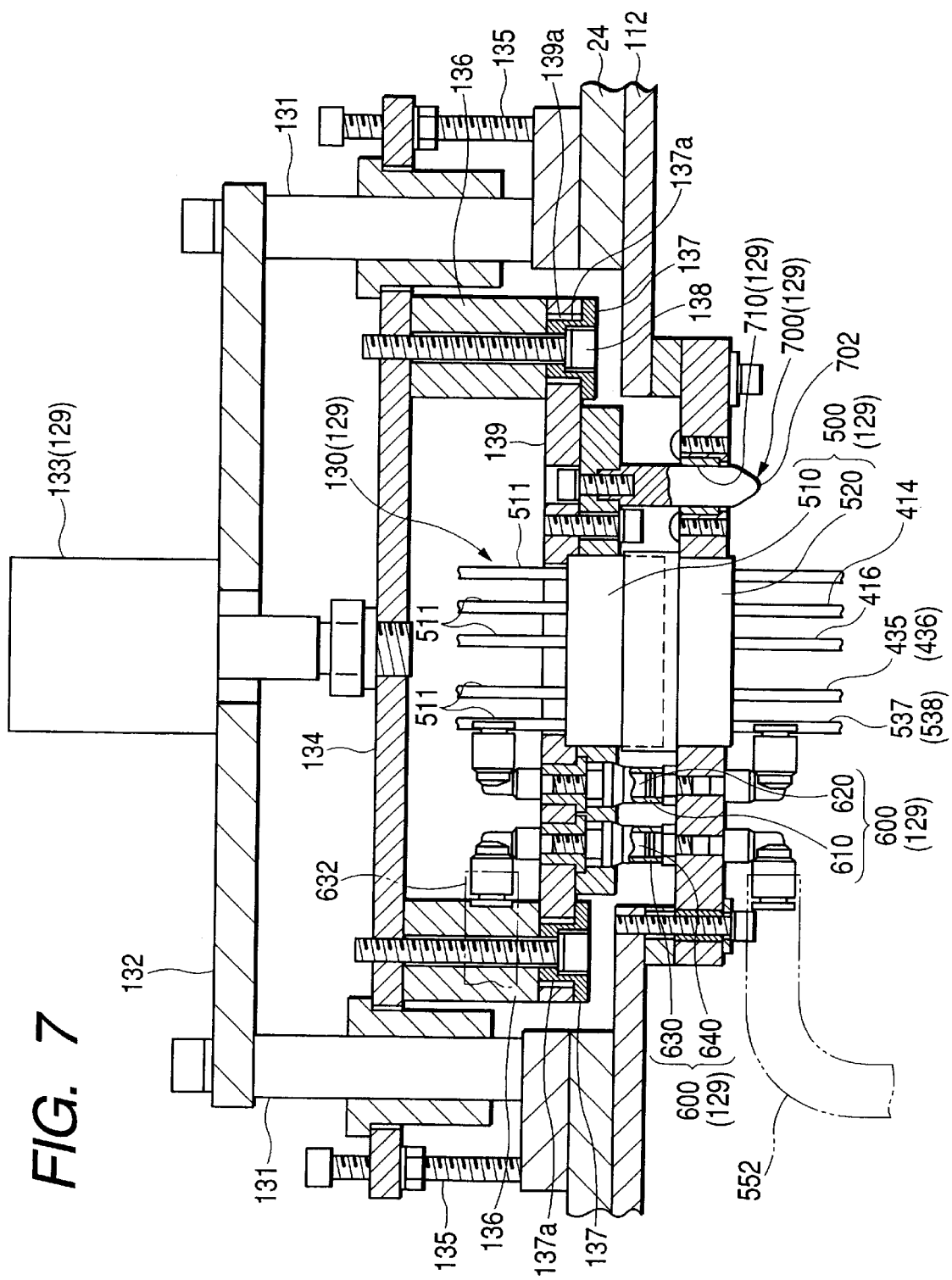
FIG. 7 is a sectional view of the connector and its surroundings when the connector part on the upper jig and the connector part on the apparatus main body.

As shown in FIGS. 6 and 7, the upper jig supportive plate 24 is provided with the female connector 510 for the electric power source and the female couplers 610 and 630 for the air tank 611, whereas the upper jig 110 is provided with the male connector 520 and the male couplers 620 and 640 that are respectively connectable to and disconnectable from the female connector 510 and the female couplers 610 and 630. Male terminals 523, 524, 525 (526) and 527 (528), inside the male connector 520, are connected to the contact unit 410 for headlamp illumination, to the contact unit 430 for clearance lamp illumination, and to the proximity switch 530, via respective electric power supply cords 414, 416, 435 (436) and 537 (538). As described above, the male coupler 640 is connected to the air cylinder 550, for vertical travel of the contact for the clearance lamp illumination, via the air hose 552.

When the upper jig supportive plate 24 is lowered to join the upper jig 110, descent of a slide unit 130 enables an automatic connection of the female connector 510 and the female couplers 610 and 630 to the male connector 520 and the male couplers 620 and 640, respectively.

More specifically, the slide unit 130 includes a slide plate 139 that is supported by a first plate 132 and a lift plate 134. The first plate 132 is supported by four rods 131, and is horizontally disposed on the upper jig supportive plate 24. The lift plate 134 is vertically movable by the air cylinder 133, and is disposed under the first plate 132. A lowermost descending position of the lift plate 134 is set with stoppers 135. At each of the four corners of the lift plate 134, a securing screw 138 protrudes downward and has disposed thereon a first spacer 136 and a second spacer 137. A slide plate 139 is assembled onto the cylindrical parts 137a of the second spacers so that it may slide horizontally. The slide plate 139 is provided with a positioning pin 700 for engagement with a pin engaging hole 710 disposed on upper jig 110, and is also provided with round holes 139a which fit loosely on the cylindrical parts 137a. Further, the slide plate 139 has disposed thereon the female connector 510 and female couplers 610 and 630. An end part 702 of the pin 700 is formed into a cusp shape and, when the pin end part 702 engages within the engagement hole 710, the slide plate 139 (the slide unit 130) slides horizontally along with insertion of the pin into the hole 710. Thusly, the slide plate 139 is positioned so that the female connector 510 and the female couplers 610 and 630 vertically can be connected to or disconnected from the male connector 520 and the male couplers 620 and 640, respectively.

A difference between an outer diameter of each cylindrical part 137a and an inner diameter of a corresponding round hole 139a is formed so as to be of the same size as a radius of the pin engagement hole 710. Therefore, aligning a center of the positioning pin 700 with a center of the pin engagement hole 710 ensures positioning of the pin end part 702 within the engagement hole 710 even when the jig 100 (the upper jig 110) is shifted horizontally from the jig supportive base 10 (See the dashed line position of the pin 700 in FIG. 6).

In this way, the horizontally-slidable slide unit 130 (having the positioning pin 700, the female connector 510 and the female couplers 610 and 630 are incorporated on the slide plate 139), the air cylinder 133 that vertically moves the slide unit 130 against the upper jig supportive plate 24, and the structure on upper plate 112 (including the pin engagement hole 710, male connector 520 and male couplers 620 and 640), constitute the connector positioning-connecting-disconnecting mechanism 129.

As shown in FIG. 2, a temporary jig mounting stand 40 includes a mount surface 42 that is continuous and flush to the base plate 12 of the jig supportive base 10. The jig mounting stand 40 is disposed behind the apparatus main body, and another jig 100A—for supporting a four-light-type headlamp—is mounted on the temporary mounting stand 40.

The jig 100A has a structure approximately the same as the jig 100 (including the upper jig 110 and the lower jig 120), except that jig 100A is configured for supporting a four-light-type headlamp on a lower jig 120A with the rear side of the headlamp facing up. Further, the upper jig 110A includes equipment necessary for inspection of the luminous intensity distribution of the four-light-type headlamp.

Inspection processes, of the luminous intensity distribution of the two-light-type headlamp, using the above-described apparatus will now be described.

First, the jig 100 is set on the apparatus main body. That is, the jig 100—including the upper jig 110 and the lower jig 120, incorporated by engagement of the pole components 114 and 124—is positioned on the base plate 12 of the jig supportive base 10. The balls 125 and plunger pins 126a on the lower jig 120 are respectively engaged with the potholes 14 and engagement holes 15 on the base plate 12 to thereby position the jig 100 on the jig supportive base 10.

Next, the air cylinder 22 is operated to lower the jig supportive plate 24 onto the upper jig 110 so that the upper jig supportive plate 24 contacts the upper plate 112. The plunger pins 116a—that protrude over the upper jig 110 engage with the engagement holes 13 in the upper jig supportive plate 24 to thereby position the upper jig 110 against the upper jig supportive plate 24.

Then, the air cylinder 133 operates to descend the slide unit 130 so that the positioning pin 700 is inserted into the engagement hole 710, and so that the female connector 510 and female couplers 610 and 630 on the slide unit 130 are connected respectively with the male connector 520 and male couplers 620 and 640 on the upper jig 110. This descent of the slide unit 130 thus enables electric power supply to the contact units 410 and 430 of the upper jig 110 via the connector 500, and allows compressed air supply to the air cylinder 550 via the coupler 600. Now, the damper 27 is operated to join the upper jig supportive plate 24 and the upper jig 110 thereby forming an incorporated body.

Figure 8:
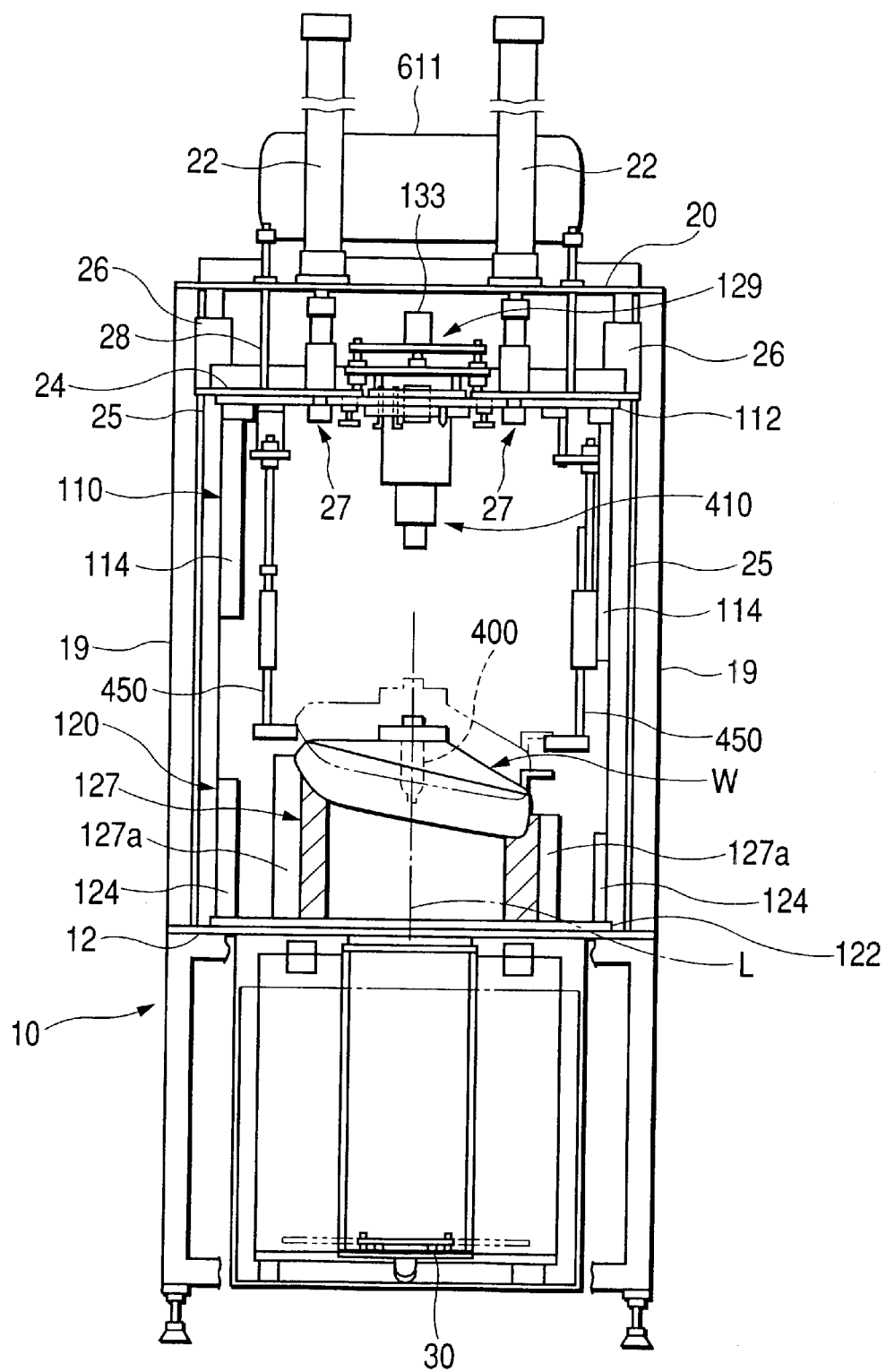
FIG. 8 is a front view of the apparatus shown in FIG. 1, wherein the jigs are set in the apparatus main body.

Subsequently, the upper jig supportive plate 24 (and the upper jig 110 connected thereto) are ascended thereby to separate the upper jig 110 greatly from the lower jig 120. A master headlamp (not shown in the figure) is then set on the supportive frame 127 of the lower jig 120 with its front side down. Next, the screen 30 is moved to the predetermined position through adjustment in the right-and-left directions so as to be aligned with the optical axis of the master headlamp (See "L" in FIG. 8). The master headlamp then is removed, and the two-light-type headlamp W is set on the lower jig 120, as shown in FIG. 8. Next, the upper jig supportive plate 24 (having the upper jig 110 and the contact unit 410 attached thereto) is descended so that the contact unit 410 is connected to the head lamp bulb 400. Also, the air cylinder 550 is operated so that the contact unit 430 is connected to the clearance bulb 420.

That is, when the upper jig supportive plate 24—having the upper jig 110 and the contact unit 410 connected thereto as the incorporated single body—descends, the contacts 412 and 413 are connected to the terminals 402 and 403 of the bulb 400, and the pole components 114 of the upper jig 110 come into the proximity of the pole components 124 of the lower jig 120. Further, when the descent of the upper jig supportive plate 24 is stopped by a signal from the proximity switch 530, the contacts 412 and 413 remain connected to the terminals 402 and 403 of the bulb 400. Then, the operation of the air cylinder 550 lowers the contact unit 430 by a predetermined amount so that the contacts 432 and 433 are connected to the terminals 422 and 423 of the bulb 420.

Although the tips of the arms 454 of the forks 450 come into contact with the headlamp W—that is supported on the supportive frame 127—when the upper jig supportive plate 24 descends, the arms 454 are pivoted upward by the headlamp contact parts as the forks 450 descend. Thus, the descent of the forks 450 is not disturbed.

After the headlamp contacts 412, 413 and of the clearance lamp contacts 432, 433 are connected to the terminals 402, 403 and 422, 423 of the bulbs 400 and 420, electric power is supplied to each of the bulbs 400 and 420 to illuminate the headlamp and the clearance lamp.

The luminous intensity distribution of the headlamp is then projected on the screen 30. And an operator determines whether the luminous intensity distribution of the headlamp is appropriate or not by comparing a cutting line of the luminous intensity distribution with a standard cutting line that is marked on the screen 30.

A photo sensor (not shown in the figure) is disposed at a predetermined position on the screen 30, and the quantity of light that is received by the photo sensor is displayed on a display part 1116 (See FIG. 5) via the CPU 1112 in the control unit. Thus, by reading the displayed data on the display part 1116, the operator can distinguish whether the quantity of light produced by the headlamp is appropriate or not. Furthermore, the operator can visually distinguish, without fail, whether or not the clearance lamp is illuminated by illumination of the bulb 420.

After completion of the above-described luminous intensity distribution inspection processes, the air cylinder 550 causes the contact unit 430 ascend thereby disconnecting the contact unit 430 from the bulb 420. Also, the air cylinder 22 operates to cause the upper jig supportive plate 24 to ascend together with the upper jig 110 and the contact unit 410, so that the contact unit 410 is disconnected from the bulb 400. At this time, the forks 450 also ascend together with the upper jig 110 and raise the headlamp W (See the dashed line in FIG. 8). The operator then takes the headlamp W away from the front of the forks 450, out of the jig 100, and mounts the next head lamp on the supportive frame 127 of the lower jig 120.

The next, and subsequent, headlamps are sequentially tested by a similar series of operations including descent of the upper jig support plate 24, connection of the contact unit 410 to the bulb 400 by operation of the air cylinder 22, connection of the contact unit 430 to the bulb 410 by operation of the air cylinder 550, illumination of the bulb 400, luminous intensity distribution inspection, separation of the contact unit 430, ascent of the upper jig supportive plates 24 (the separation of the contact unit 410 from the bulb 400), and removal of the headlamps.

Next will be described a case wherein the apparatus main body is used for the luminous intensity distribution inspection of a four-light-type headlamp—as opposed to the luminous intensity distribution inspection of the two-light-type headlamp. That is, use of the apparatus in a four-light-type headlamp assembly line is described hereafter.

In this case, jig 100 is replaced with a jig 100A that has a structure which can support the four-light-type headlamp and which includes two contact units for electric power supply to two headlamp bulbs. As shown in FIG. 2, the jig 100A is mounted on the temporary jig mounting stand 40 which is located behind the apparatus main body. The jig 100A is provided with an ID plate 1200A which is a non-contact-type memory plate that stores the operating condition data for the equipment necessary to inspect the luminous intensity distribution of the four-light-type headlamp.

First, the upper jig supportive plate 24 is lowered so that the pole components 114 of the upper jig 110 and the pole components 124 of the lower jig 120 are engaged vertically. Next, the dampers 27 are operated to release the engagement between the upper jig supportive plate 24 and the upper jig 110. The upper jig supportive plate 24 is then raised, and the plungers 126 on the lower jig 120 are operated to draw the plunger pins 126a out of the engagement holes 15. The jig 100 may then be slid along the base plate 12 and onto the temporary-mounting stand 40. Next, the four-light-type headlamp jig 100A, which is mounted on the temporary mounting stand 40, is slid onto the base plate 12 so that the jig 100A is positioned against the jig supportive base 10.

Subsequently, the upper jig supportive plate 24 is lowered so as to connect of the female connector and female couplers on the upper jig supportive plate 24 to the male connector and male couplers on the jig 110A by operation of the connector positioning-connecting-disconnecting mechanism 129. Then, the upper jig supportive plate 24 and the jig 110A are joined and incorporated by operation of the dampers 27, thereby completing the replacement operation. The upper jig supportive plate 24 then is raised, together with the incorporated upper jig 110A. And after the positional adjustment of the screen 30 with use of the master headlamp, a four-light-type headlamp is set on the lower jig 120A.

When the upper jig 100A is joined with the upper jig supportive plate 24, the ID plate 1200A on the upper jig 100A is positioned opposite the non-contact-type reader 1300 on the apparatus main body (the upper jig supportive plate 24) so that the data stored in the ID plate 1200A are read by the non-contact-type reader 1300. Next, the CPU 1112 inside the control unit 1100 carries out the luminous intensity distribution test on the four-light-type headlamp, based on the ID-plate data as read via the reader 1300.

Although, in the above-described embodiment, the ID plate 1200 (1200A) is disposed on the back side of the upper jig 110 (110A), the position where the ID plate 1200 (1200A) is disposed is neither limited to the back side of the upper jig 110 (110A) nor limited to the upper jig 110 (110A) That is, the ID plate 1200 (1200A) on the jig, and the reader 1300 on the apparatus main body, may be disposed at any prescribed position where the reader 1300 can read the information on the ID plate 1200 (1200A).

Moreover, the jig temporary mounting stand 40 that is disposed behind the apparatus main body in the above-described embodiments may be disposed either on the lateral side of the apparatus main body or on both the rear and lateral sides.

Furthermore, although the above-described embodiments are explained with reference to an apparatus for inspecting the headlamp luminous intensity distribution, as part of a headlamp assembly line, this invention may be similarly applied as an apparatus for tightening aiming screws, or as an apparatus for other processes performed on a headlamp assembly line.

Furthermore, the application is not limited to a headlamp assembly line. Instead, it is possible to use the lamp assembling apparatus for other vehicle lamp assembling lines.

It is clear from the explanation above, that the vehicle lamp assembling apparatus of the present invention minimizes processing information to be stored in the control part of the apparatus main body. That is, processing information—such as driving procedures and drive amount of the equipment—which specifically corresponds to the lamp or lamp component that is supported by the jig, can be stored in the non-contact-type memory plate on the jig. Accordingly, it is sufficient to provide an inexpensive, simply configured, control part on the apparatus main body, thereby reducing lamp assembly line costs and, thus, similarly reducing the production cost of the lamp to be manufactured.

According to the present invention, one jig that is set on the apparatus main body—which main body constitutes part of a lamp assembly line—may be replaced with another jig thereby enabling use of one apparatus main body to assemble lamps of different configurations and specifications. Therefore, it is possible to assemble two or more different kinds of lamps in a single lamp assembly line.

Moreover, little modification or addition to the control program on the apparatus main body is necessary at the time of replacing one jig with another jig (i.e., at the time of jig exchange) and, therefore, the control program is simplified.

It is contemplated that numerous modifications may be made to the vehicle lamp assembling apparatus of the present invention without departing from the spirit and scope of the invention as defined in the following claims.

What is claimed is:

1. A vehicle lamp assembling apparatus comprising:
   a first jig adapted to support a first lamp component;
   an apparatus main body having disposed thereon a positioning and fastening mechanism to fasten the first jig to the apparatus main body;
   equipment, disposed on at least one of the apparatus main body and the first jig, for carrying out a processing operation on the first lamp component supported by the first jig;
   a control part, disposed on the apparatus main body, to control the manner in which the equipment is driven;
   a first non-contact memory plate disposed on the first jig, the first non-contact memory plate storing first processing information for the equipment; and
   a non-contact memory reader disposed on the apparatus main body in a position opposite that of the first non-contact memory plate when the first jig is fastened to the apparatus main body,
   wherein the control part drives the equipment based on the first processing information read from the first memory plate via the non-contact memory reader.

2. The vehicle lamp assembling apparatus as claimed in claim 1, further comprising:
   a second jig adapted to support a second lamp component, wherein specifications of the second lamp component are different from those of the first lamp component; and
   a second non-contact memory plate disposed on the second jig, the second non-contact memory plate storing second processing information for the equipment,
   wherein when the second jig is fastened to the apparatus main body, the second non-contact memory plate is disposed in a position opposite that of the non-contact memory reader, and the control part drives the equipment based on the second processing information as received from the non-contact memory reader.

3. The vehicle lamp assembling apparatus as claimed in claim 2, wherein the second jig and the first jig are exchangably fastenable to the apparatus main body.

4. The vehicle lamp assembling apparatus as claimed in claim 2, wherein the second processing information is different from said first processing information.

5. The vehicle lamp assembling apparatus as claimed in claim 1, wherein the processing operation carried out by said equipment includes an operation to distinguish whether a quantity of light produced by a lamp is appropriate or not.

6. The vehicle lamp assembling apparatus as claimed in claim 1, wherein the processing operation carried out by said equipment includes an operation to determine whether the luminous intensity distribution of a lamp is appropriate or not.

7. The vehicle lamp assembling apparatus as claimed in claim 1, wherein the processing operation carried out by said equipment includes an operation to visually distinguish whether or not a lamp is properly illuminated by illumination of a bulb.

8. The vehicle lamp assembling apparatus as claimed in claim 1, wherein the control part includes a CPU and a memory part, and the CPU controls electric power supply to the equipment with being based on data stored in the memory part.

9. The vehicle lamp assembling apparatus as claimed in claim 8, the equipment includes at least one of a cylinder and a bulb of a lamp.

10. The vehicle lamp assembling apparatus as claimed in claim 1, wherein the first non-contact memory plate includes:
    a signal transmission-reception part;
    a signal processing part;
    a data conversion part; and
    a memory,
    wherein electromagnetic data exchange occurs between the signal transmission-reception part and the non-contact memory reader where the signal transmission-reception part confronts the non-contact memory reader.

11. The vehicle lamp assembling apparatus as claimed in claim 1, wherein the non-contact memory reader includes:
    a signal transmission-reception part;
    a signal processing part; and
    a data conversion part,
    wherein the data received by the signal transmission-reception part are converted into digital signals by the signal processing part and the data conversion part, and the digital signals are then stored in a memory part via a CPU, both the memory part and the CPU being inside the control part.

12. The vehicle lamp assembling apparatus as claimed in claim 1, wherein the equipment includes a first air cylinder, and the first air cylinder is operated to lower a jig supportive plate onto the first jig so that the jig supportive plate contacts the first jig and is engaged with plunger pins protruded over the first jig by first engagement holes in the jig supportive plate to thereby position the first jig against the jig supportive plate.

13. The vehicle lamp assembling apparatus as claimed in claim 1, wherein the equipment includes a second air cylinder, and the second air cylinder operates to descend a slide unit so that a positioning pin provided on the slide unit is inserted into a second engagement hole on the first jig so that a female connector and a female coupler on the slide unit are connected respectively with a male connector and a male coupler on the first jig.

14. The vehicle lamp assembling apparatus as claimed in claim 1, wherein the equipment includes a damper to join a jig supportive plate and an upper jig of the first jig thereby forming an incorporated body.

15. The vehicle lamp assembling apparatus as claimed in claim 1, wherein the equipment includes a jig supportive plate connectable to the first jig, and the jig supportive plate separates an upper jig of the first jig from a lower jig of the first jig when the jig supportive plate connected to the upper jig of the first jig is ascended.

16. The vehicle lamp assembling apparatus as claimed in claim 1, wherein the equipment includes a jig supportive plate connectable to the first jig, and the jig supportive plate connects a first contact unit on the first jig to a first bulb of a first lamp.

17. The vehicle lamp assembling apparatus as claimed in claim 1, wherein the equipment includes a third air cylinder, and the third air cylinder is operated to connect a second contact unit to a second bulb of a second lamp.

18. The vehicle lamp assembling apparatus as claimed in claim 1, wherein the equipment includes:
- at least one first contact for a first lamp; and
- at least one second contact for a second lamp,
- wherein electric power is supplied to each of bulbs of the first and second lamps to illuminate the first and second lamps.

* * * * *